United States Patent [19] [11] 4,078,578
Buchholz [45] Mar. 14, 1978

[54] BEVERAGE DISPENSING VALVE

[75] Inventor: Dieter Buchholz, Hilden, Germany

[73] Assignee: The Cornelius Company, Minneapolis, Minn.

[21] Appl. No.: 660,057

[22] Filed: Feb. 23, 1976

[30] Foreign Application Priority Data

Mar. 7, 1975 Germany .......................... 071215[U]

[51] Int. Cl.$^2$ .......................... B67D 1/12; F16K 47/16

[52] U.S. Cl. .................................... 137/614; 137/269; 137/614.11; 137/614.12; 137/614.19; 137/798; 251/122

[58] Field of Search ..................... 137/329.4, 600, 614, 137/614.11, 614.12, 614.19, 269, 798; 251/122

[56] References Cited

U.S. PATENT DOCUMENTS

| | | | |
|---|---|---|---|
| 294,674 | 3/1884 | Richter | 137/614.11 X |
| 1,633,642 | 6/1927 | Kramer | 137/614.11 X |
| 2,121,281 | 6/1938 | Bosque | 137/614 X |
| 2,575,658 | 11/1951 | Del Nero | 137/614.11 X |
| 2,899,170 | 8/1959 | Cornelius | 251/122 |
| 3,291,441 | 12/1966 | Hansen | 251/122 |
| 3,359,996 | 12/1967 | Cornelius | 137/614.12 X |
| 3,612,354 | 10/1971 | Sitton et al. | 137/614.19 X |
| 3,863,673 | 2/1975 | Sitton | 137/614.11 |

*Primary Examiner*—Alan Cohan
*Assistant Examiner*—Gerald A. Michalsky
*Attorney, Agent, or Firm*—Henry C. Kovar

[57] ABSTRACT

A beverage dispensing valve for pressurized beverages having a faucet portion, a rear portion having a flow control and a check valve portion fluidly connecting the faucet and rear portions enabling removal of the faucet portion while the rear and check valve portions are under pressure; the check valve portion has a check valve which is actuatable by a valve element in the faucet for dispensing of beverage and may have structure for adjusting the flow control in the rear portion.

15 Claims, 1 Drawing Figure

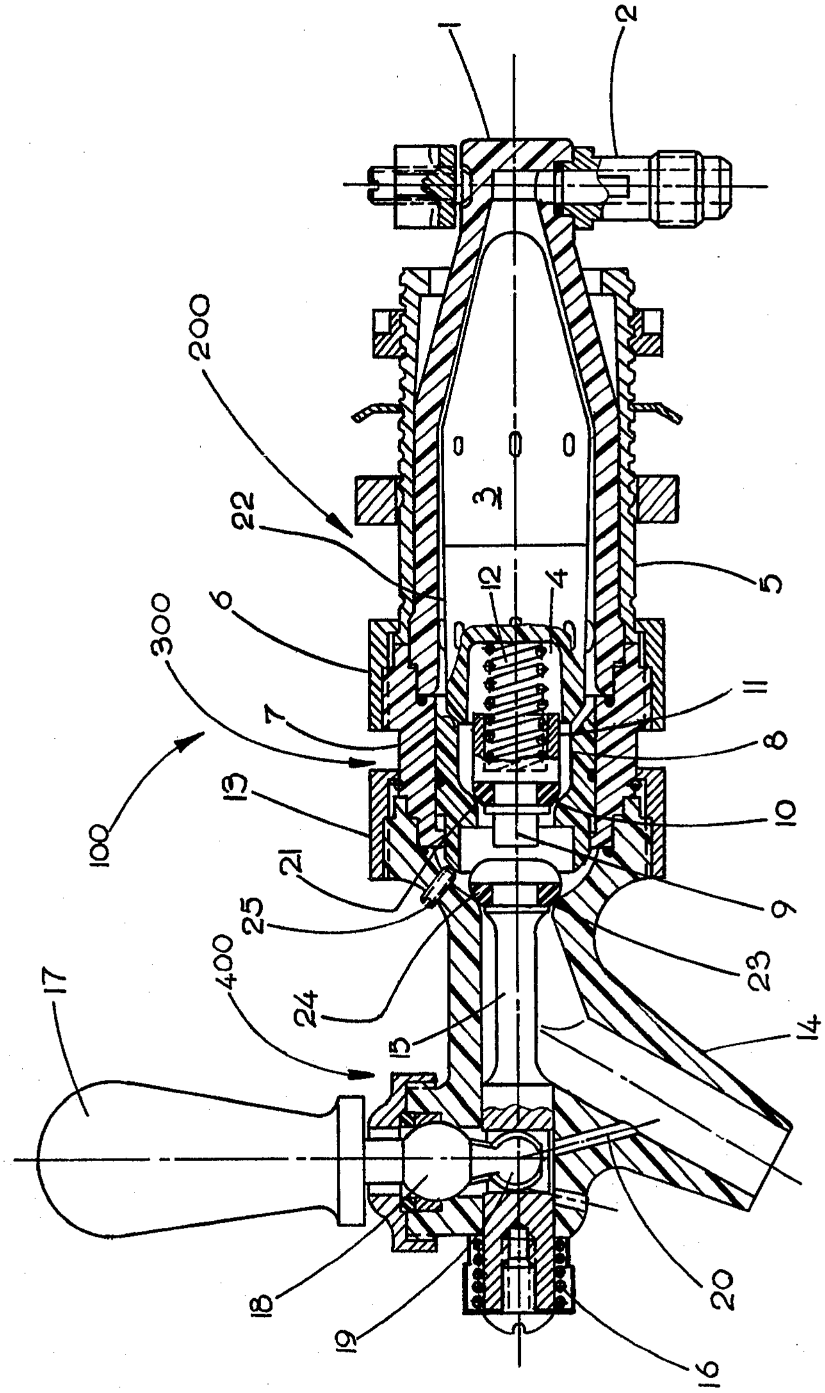
1
2
200
3
22
12
4
5
6
300
7
11
8
100
13
10
21
9
25
23
24
400
17
15
14
20
18
19
16

BEVERAGE DISPENSING VALVE

BACKGROUND OF THE INVENTION

Field of the Invention

This invention pertains to a beverage dispensing valve having a faucet which is removable while a flow control element remains under pressure and a check valve precludes flow; and to check valve actuatable by the faucet and having structure for adjusting a flow control.

Prior Art

There are two most representative and commercially successful examples of prior art. The first example is the R. T. Cornelius dispensing valve as disclosed in U.S. Pat. No. 2,899,170. This valve has been the most used and successful of any beverage valve since its introduction in commerce. A specialized example of this dispensing valve is disclosed in U.S. Pat. No. 3,233,631.

A second and later example of a beverage dispensing valve is the H. J. Hansen valve as disclosed in U.S. Pat. No. 3,291,441. It is believed that this valve has been commercially successful as many are believed to be in use.

The Cornelius and the Hansen valves are believed to be the most pertinent prior art and also are believed to be the industry standards as of this invention. Both valves work well, but neither provides for cleaning of the faucet, which is exposed to ambient air and its accompanying dust, vapors, insects and like contaminants, without depressurizing the entire beverage system in order to enable removal of the faucet from the rear portion of the valve. It is necessary that the faucet portion be periodically removed and washed and sanitized to clean off contaminants. The frequency of needed cleaning would be somewhat dependent upon the conditions in which the valve was used.

SUMMARY OF THE INVENTION

In accordance with this invention, an improved beverage dispensing valve is provided having a rear portion with a flow control, a front portion with a faucet and a valve, and a central portion with a check valve; the front portion being removable from assembled and pressurized rear and central portions; also in accordance with the invention, a check valve portion is provided forming a check valve and having a housing structure for being connected to a rear flow control portion, structure for retaining a front faucet portion, a check valve actuatable by the faucet portion, and structure for adjusting a flow control in the rear portion.

Accordingly, it is an object of the present invention to provide a beverage dispensing valve having a removable faucet.

It is an object of the present invention to provide a beverage dispensing valve having a pressurizable flow control which is adjustable from a removable faucet.

It is another object of the present invention to provide a beverage dispensing valve having a normally closed check valve which is openable by a valve in a removable faucet.

It is an important further object of the present invention to provide a check valve installable between flow control and faucet portions of existing beverage valves and enabling removal of the faucet while the flow control is pressurized.

It is further object of the present invention to provide, in a check valve, structure for connecting a flow control adjuster in a removable faucet to a pressurizable flow control.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWING

The drawing is an elevational sectional view taken in a vertical plane along the centerline of a beverage dispensing valve provided in accordance with the principles of the present invention.

AS SHOWN ON THE DRAWING

The principles of the present invention are particularly useful when embodied in a beverage dispensing valve of the type illustrated in the drawing and generally indicated by the numeral 100. The dispensing valve 100 includes a rear portion 200, a check valve portion 300 connected to the rear portion 200 and a faucet portion 400 removably connected to the check valve portion 300 as will be explained.

The rear portion 200 has a housing 1 having an inlet 2 for being connected to a source of pressurized beverage, examples of which are carbonated soft drink, beer or juice. The housing 1 is an elongate tubular member and has on the inside a flow control member 4. The member 3, which is also of an elongated configuration is axially slideable inside of the housing 1 for adjusting of the annular gap between the illustrated conical portion to the right or upstream side of member 3 for controlling the rate of flow of beverage therethrough. The member 3 has at its left or downstream side an indentation or pocket 4 for purposes to be later described.

The rear portion 200 also has a mounting collar 5 which is for mounting the valve 100 to a counter in a bar (not shown) or similar structure for holding the valve 100. On the left side of the rear portion 200 as is shown there is a collar nut 6 which is for retaining an outlet valve to the rear portion 200.

Check valve portion 300 is mounted to rear portion 200 and retained by collar nut 6. The check valve portion 300 has a cylindrical housing 7 retained fluid tightly to the flow control housing 1 and a tubular sleeve 8 within which there is a check valve formed by a reciprocable plunger type valve member 9 and a valve seat 10. On the upstream side of plunger member 9 there is a cylindrical guide 11 for a spring 12 which biases the plunger 9 against the seat 10.

The tubular sleeve 8 is axially slidable inside of the housing 7 and there is an O-ring fluid tight seal between sleeve 8 and housing 7. The housing 7 has at its left or downstream end a reduced diameter keeper for retaining the sleeve 8 in the housing 7 against beverage pressure. The sleeve 8 has on its right or upstream end, an annular surface which is shown as having a concave frusto-conical configuration facing toward the flow control member 3 which has at its downstream end as is shown, a convex frusto-conical annular surface. The sleeve 8 has at least one knob or bump and preferably a number of spaced apart protuberances to hold the flow control member 3 in position against beverage flow and to provide an annular passageway for beverage to flow around the downstream end of the flow control member 3 and into the sleeve 8 to the check valve seat 10.

At the left or downstream end of check valve portion 300 there is a collar nut 13 for retaining a front portion 400 and more specifically to retain the faucet body 14 fluid tightly to check valve housing 7. There is within the faucet body 14 a normally closed reciprocable plunger valve 15 biased to the left or into the closed position by a spring 16 and connected to an actuator knob 17 by a ball 18 and level 19 mechanism. This illustrated actuator mechanism can also take the form of a cup actuated lever, a squeeze trigger, solenoid valve or the like as long as the actuator will reciprocate the plunger valve 15. The actuator may also simply be the exposed outer or left end of the plunger valve 15 which may be actuated push button style. Air vents 20 provide for draining of the spigot in the faucet body 14.

There is a soft elastomeric valve 21 which is mounted on the check valve plunger 9 an normally bears against the valve seat 10 forming a normally closed outlet from beverage passageway 22, defined in the embodiment shown as the annular passageway extending from inlet 2 to valve seat 10. The valve seat 10 is formed by an annular surface facing against the flow control member 3 and about an aperture through the sleeve 8.

There is a soft elastomeric valve 23 which is mounted on plunger valve 15 and normally bears against a valve seat 24 in faucet body 14.

For purposes of economy and simplification, elastomeric valve 21 is similar to and interchangeable with elastomeric valve 23.

There is an adjusting screw 25 mounted to the faucet body 14 which engages the tubular sleeve 8 and pushes the sleeve 8 off the keeper of housing 7 and into the passageway 22 against beverage pressure. The sleeve 8 physically engages against the flow control member 3 and holds the member 3 in a desired position to control the rate of beverage flow.

It should be explained that the faucet portion 400 can be connected directly to the rear portion 200 as is shown and very well explained in U.S. Pat. No. 2,899,170. When such is done the adjusting screw 25 bears directly against the downstream facing convex frusto-conical end surface of member 3. The downstream facing convex frusto-conical annular end surface of tubular sleeve 8 is similar to and the operative equivalent of that end on the member 3 and the upstream end of tubular sleeve 8 engages the end surface which would, without the sleeve 8, engage the adjusting screw 25.

Collar nut 6 and collar nut 13 are similar and interchangeable and in view of the foregoing, the advantage will be realized that an existing valve in accordance with U.S. Pat. No. 2,899,170 can have the check valve portion 300 installed and then become a disconnectable valve where the faucet is removable for cleaning while the rear portion 200 and valve portion 300 remain pressurized In operation, the inlet 2 is connected to a source of pressurized beverage which may be pressurized in a range anywhere from 2 PSIG to 125 PSIG. The check valve portion 300 is normally closed and precludes flow of beverage. The front portion 400 is mounted with the plunger valve 15 closed preventing access to the check valve by insects, dust and dirt and the like in ambient air.

To dispense beverage, the faucet plunger valve 15 is a reciprocated off the valve seat 24 opening the faucet valve and against the check valve plunger 9 and upon further reciprocation of faucet plunger 15, the check valve plunger 9 will be reciprocated off check valve seat 10 and beverage will be dispensed. As the check valve plunger 9 is reciprocated, its upstream end and cylindrical guide 11 and spring 12 are pushed into the pocket 4 of member 3. It will be appreciated that the spring 12 is strong enough to urge the check valve plunger 9 against the check valve seat 10 and weak enough to allow beverage pressure to force the flow control member 3 against the tubular sleeve 8.

When both valves are open and beverage is flowing, the rate of flow is adjusted for proper dipensing. Obviously if the flow rate is too slow it is objectionable; if the flow rate is too fast, carbonated beverages such as colas and root beers foam. If adjusting screw 25 is turned out, both the sleeve 8 having the check valve seat 10 and the flow control member 3 are moved toward the flow control outlet; if screw 25 is turned in both the sleeve 8 and flow control member 3 move upstream simultaneously and decrease the rate of flow. After flow rate is set, the dispensing valve 100 is ready for a day's operation.

When the faucet portion 400 becomes dirty, the collar nut 13 is backed off and faucet 400 is removed and cleaned. While the faucet portion 400 is removed, the check valve portion 300 precludes flow of beverage and may be covered to prevent dirt and insects from getting on the plunger 9 and sleeve 8. After washing of the valve portion 400, it is reinstalled to the check valve portion 300 and the dispensing valve 100 is again ready to operate.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A beverage dispensing valve having connected flow control and faucet portions which are separable while the flow control portion is under pressure, comprising a. a flow control housing having an elongated cylindrical passageway with an inlet for being connected to a source of pressurized beverage;

b. a flow control member axially movable in the passageway for controlling the rate of flow of beverage therethrough;

c. a normally closed check valve having a seat and a reciprocable plunger valve which are in and which normally close the passageway, and which are both axially co-movable with the flow control member, said check valve having therein means for positioning the flow control member during flow of beverage through the passageway; and d. a faucet having 1. a normally closed reciprocable valve member which when opened operatively engages the plunger valve and opens the check valve for flow of beverage therethrough; and 2. adjustment means for simultaneously axially adjusting the position of the check valve and the flow control member in the passageway for adjusting the rate of flow of beverage, the faucet and adjustment means being separable from the flow control portion while the flow control is under pressure, with the check valve remaining in the flow control position for precluding flow of beverage during such separation.

2. A beverage dispensing valve according to claim 1, in which the flow control member and the check valve seat and check valve plunger are axially removable from a downstream end of the passageway, and the passageway has therein at its downstream end a keeper for retaining the flow control member and check valve seat in the passageway upon separation of the facuet from the flow control portion, said keeper being removable from said flow control portion.

3. A beverage dispensing valve according to claim 1, in which the check valve seat is an apertured annular valve seat facing the flow control member with the reciprocable plunger check valve being normally on the valve seat, the plunger check valve having an upstream end between the check valve seat and the flow control member, said upstream end being reciprocable off the valve seat and into a pocket on the downstream side of the flow control member during opening of the check valve, there being an annular beverage passageway outside of and around the flow control member and the upstream end of the plunger valve to the valve seat, there being a spring between the plunger valve and the flow control member for biasing the plunger valve against the seat, said spring being enclosed by the flow control member pocket and the plunger valve.

4. A check valve for a beverage dispensing valve of the type having separable front and rear portions initially removably secured to each other with the rear portion having an elongate axially adjustable rate of flow control member and an inlet for being connected to a source of pressurized beverage and means for retaining the front portion to said rear portion, the front portion having a faucet with a valve and a retention structure complemental to and retainable by said retaining means for the retention of the front portion to the rear portion, said check valve being mountable between the front and rear portions and having a. a housing;

b. means for connecting said housing fluid tightly to the rear portion, said connecting means including a retention structure on an upstream end of the housing, said housing retention structure being substantially identical to that retention structure on the front portion;

c. means on a downstream end of the housing for retaining the front portion fluid tightly to said housing, said retaining means on said housing being substantially identical to said retaining means on the rear portion;

d. a check valve element in said housing enabling removal of the front portion from said housing while the rear portion and said housing are connected and under pressure; and e. means in said housing for axially positioning the flow control member in the rear portion.

5. A check valve for a beverage dispensing valve of the type having separable front and rear portions initially removably secured to each other with the rear portion having an adjustable rate of flow control and an inlet for being connected to a source of pressurized beverage, the front portion having a faucet with a valve and means for adjusting the rear portion rate of flow control and means for opening the check valve, said check valve being mountable between the front and rear portions and having a. a housing;

b. means for connecting said housing fluid tightly to the rear portion;

c. means for retaining the front portion fluid tightly to said housing;

d. a check valve element in said housing enabling removal of the front portion from said housing while the rear portion and said housing are connected and under pressure, said check valve being openable by the front portion valve; and e. means in said housing for operatively connecting the flow control adjusting means in the front portion to the rate of flow control in the rear portion.

6. A check valve according to claim 5, in which the flow control connecting means comprises a tubular sleeve which is axially movable within the housing and the passageway, for holding the flow control member in a pre-adjusted position against a flow of beverage.

7. A check valve according to claim 6, in which the housing has therein a keeper for retaining the slidable tubular sleeve in the housing when the housing and sleeve are under pressure.

8. A check valve according to claim 6, including an axially slidable seal ring fluid tightly sealing the tubular sleeve and the housing to each other.

9. A beverage dispensing valve comprising a. a rear portion having
   1. an elongated passageway for flow of beverage therethrough,
   2. a passageway inlet for being connected to a source of pressurized beverage,
   3. an elongate flow control member within the passageway, the member being axially positionally adjustable for controlling the rate of flow of beverage through the passageway, and
   4. means for retaining a front faucet portion on an outlet of the passageway;

b. a front portion forming a faucet and having
   1. a faucet body retainable to the rear portion by said faucet retaining means,
   2. a normally closed plunger valve in the faucet body, said plunger valve being reciprocable to an open position in which said plunger is effective for engaging and opening a normally closed check valve positioned between the front portion plunger valve and the rear portion, and
   3. an actuator for reciprocating the plunger valve; and c. a check valve removably retained to both of the rear portion and the front faucet portion, said check valve being between the rear portion and front faucet portion and having
   1. a housing removably retained to the rear portion by said faucet retaining means,
   2. a check valve seat in the housing,
   3. a reciprocable check valve plunger element normally seated against and closing the valve seat, said check valve plunger element being reciprocably movable off of said seat by said faucet plunger valve upon the opening of said faucet plunger valve,
   4. means in said housing for adjusting the axial position of the flow control member in the rear portion, and
   5. means for retaining said front faucet portion to said check valve, said front faucet portion being retained to said check valve housing by said retaining means on said check valve, both of said retaining means being similar to each other and interchangeably operable for retaining said front faucet portion to either of said rear portions or said check valve in an operative beverage dispensing position.

10. A beverage dispensing valve comprising a. a rear portion having 1. an elongated passageway for flow of beverage therethrough,
2. a passageway inlet for being connected to a source of pressurized beverage,
3. an elongate flow control member within the passageway, the member being axially positionally adjustable for controlling the rate of flow of beverage through the passageway, and
4. means for retaining a valve on an outlet of the passgeway;

b. a check valve fluidly connected to the outlet of the passageway and having 1. a housing retained to the rear portion by the valve connecting means,
2. a check valve seat in the housing,
3. a check valve plunger element reciprocably mounted in the housing,
4. an elastomeric seating member mounted on the check valve plunger element, said seating member being normally seated against said check valve seat for closing the check valve,
5. means for axially positioning the flow control member, and
6. means for retaining a faucet to the check valve; and c. a front portion forming a faucet and having 1. a faucet body retained to the check valve housing by the faucet retaining means,
2. a normally closed reciprocable plunger valve element in the body, which plunger valve element when reciprocated to an open position is operative for engaging and opening the normally closed check valve,
3. an actuator for reciprocating the front portion plunger valve element, and
4. an elastomeric seating member mounted on the front portion plunger valve element and being normally seated against a faucet valve seat for closing the faucet, both of said seating members being substantially identical to each other and interchangeable one for another.

11. A beverage dispensing valve comprising a. a rear portion having 1. an elongated passageway for flow of beverage therethrough,
2. a passageway inlet for being connected to a source of pressurized beverage,
3. an elongate flow control member within the passageway and having a concave pocket at a downstream end thereof, said member being axially positionally adjustable for controlling the rate of flow of beverage through the passageway, and
4. means for retaining a valve on an outlet of the passageway;

b. a check valve fluidly connected to the outlet of the passageway and having 1. a housing retained to the rear portion by the valve retaining means,
2. a check valve seat in the housing,
3. a normally closed reciprocable check valve plunger element in the valve seat,
4. a cylindrical spring guide on an upstream side of said check valve plunger element, said guide being reciprocably movable into said flow control pocket upon opening of the check valve,
5. means for axially positioning the flow control member, and
6. means for retaining a faucet to the check valve;

c. a spring mounted within the guide and the flow control pocket, and reactively between the flow control and check valve plunger element for biasing the check valve plunger element against the check valve seat, and d. a front portion forming a faucet and having 1. a faucet body retained to the housing by the faucet retaining means,
2. a normally closed reciprocable plunger valve element in the body, which when reciprocated and opened is operative for engaging and opening the normally closed check valve, and,
3. an actuator for reciprocating the front portion plunger valve element.

12. A beverage dispensing valve comprising a. a rear portion having 1. an elongated passageway for flow of beverage therethrough,
2. a passageway inlet for being connected to a source of pressurized beverage,
3. an elongate flow control member within the passageway, the member being axially positionally adjustable for controlling the rate of flow of beverage through the passageway, and
4. means for retaining a valve on an outlet of the pasageway;

b. a check valve fluidly connected to the outlet of the passageway and having 1. a housing retained to the rear portion by the valve retaining means,
2. a check valve seat in the housing,
3. a normally closed reciprocable check valve plunger element in the valve seat,
4. a tubular sleeve axially slidably mounted within the housing, said sleeve being in physical engagement with the flow control member for comovement therewith, and
5. means for retaining a faucet on the check valve housing; and c. a front portion forming a faucet and having 1. a faucet body retained to the housing by the faucet retaining means,
2. a normally closed reciprocable plunger valve element in the body, which when reciprocated and opened is operative for engaging and opening the normally closed check valve,
3. and actuator for reciprocating the front portion plunger valve element, and
4. adjustment means for simultaneously axially moving both the tubular sleeve and the flow control member, for adjusting a rate of flow of beverage through the dispensing valve.

13. A beverage dispensing valve according to claim 12, in which the check valve seat is within and is a portion of the axially slidable tubular sleeve, said check valve seat and reciprocable plunger valve being adjustably co-movable with the flow control member upon adjusting operation of the adjustment means in the front faucet portion.

14. A beverage dispensing valve according to claim 12 in which the faucet body has therein the means for adjusting the flow control member and the flow control member has a complementary adjustment means engager configuration on its downstream end for engaging the adjusting means, the tubular sleeve spacing apart and being positioned between and in engagement with both the flow control member and the adjustment means, the tubular sleeve having a downstream end with an adjustment means engager similar to and the equivalent of that of the flow control member with said downstream end being in engagement with the adjustment means, the tubular sleeve also having an upstream end engaging the adjustment means engager of the flow control member and connecting the adjustment means to the flow control member via the axially movable tubular sleeve.

15. A beverage dispensing valve according to claim 14, in which the upstream end of the slidable tubular sleeve has a number of spaced apart protuberances engaging the adjustment means engager of the flow control for holding the flow control member in an adjusted position against any flow of beverage, said protuberances also providing an annular passageway for flow of beverage between the downstream end of the flow control member and the tubular member.

* * * * *